UNITED STATES PATENT OFFICE.

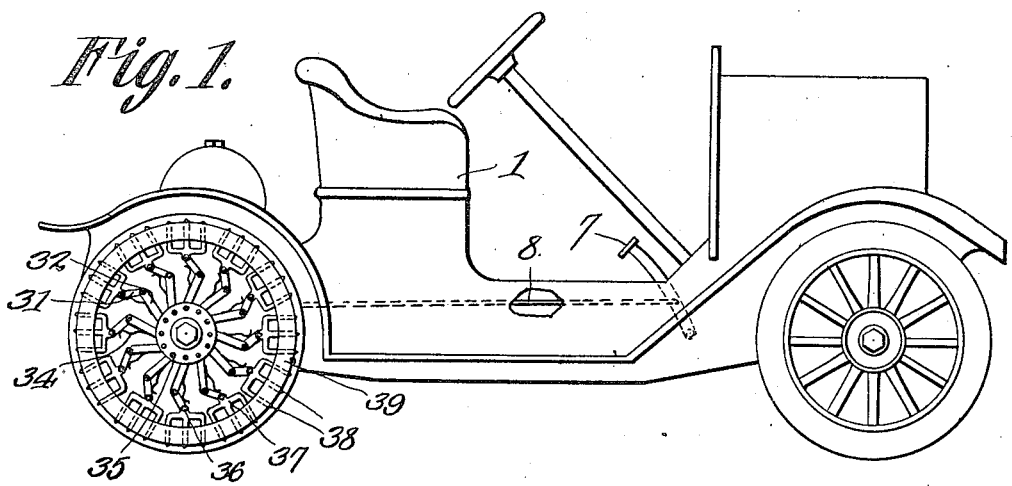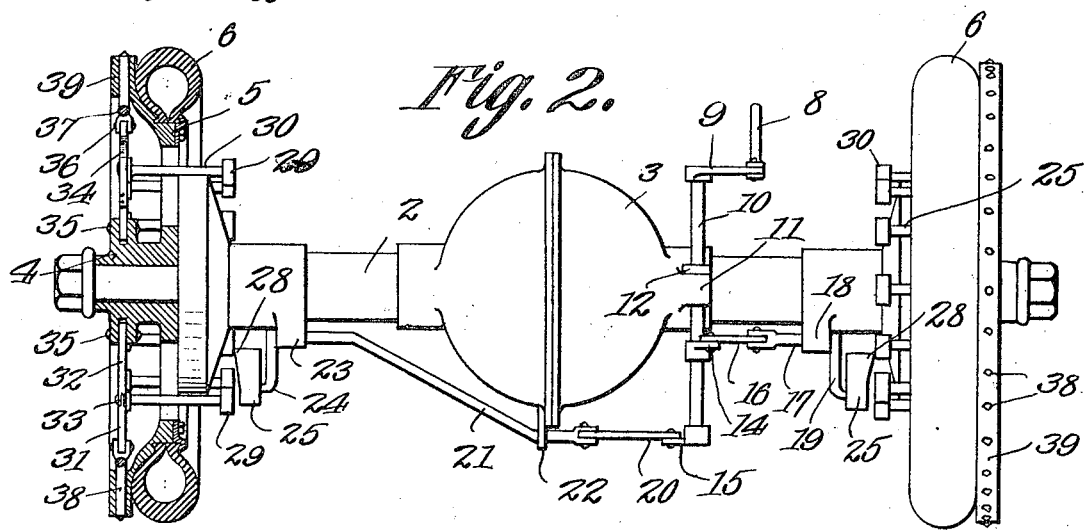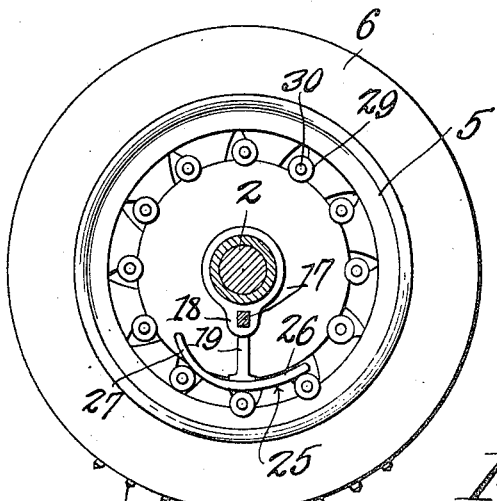

FRANK H. BABCOCK, OF PUNXSUTAWNEY, PENNSYLVANIA.

AUTO WHEEL ATTACHMENT.

1,130,366.      Specification of Letters Patent.      Patented Mar. 2, 1915.

Application filed April 7, 1913. Serial No. 759,516.

*To all whom it may concern:*

Be it known that I, FRANK H. BABCOCK, a citizen of the United States, residing at Punxsutawney, in the county of Jefferson and State of Pennsylvania, have invented a new and useful Auto-Wheel Attachment, of which the following is a specification.

The device forming the subject matter of this application is a structure adapted to be applied to the wheel of a vehicle for the purpose of preventing skidding and for the purpose of enhancing the grip of the vehicle wheel upon the ground.

The invention aims to provide novel means for advancing and retracting the gripping or anti-skidding element.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings: Figure 1 shows in side elevation, a vehicle to which the present invention has been applied; Fig. 2 is a rear elevation, parts appearing in section; Fig. 3 is a transverse section through the rear axle of the vehicle, the inner face of one rear wheel appearing in elevation; Fig. 4 is a plan showing a pair of links whereby the gripping element is immediately actuated; and Fig. 5 is a plan showing a portion of the operative connection between the actuating pedal and the means whereby the grips are controlled.

In the drawings, the numeral 1 indicates the body of a vehicle, the numeral 2 indicating the rear axle, the differential casing being shown at 3, the hub of the rear wheel being indicated at 4 and the numeral 5 indicating the rim of the rear wheel. The rim 5 may support a tire 6 of any desired construction.

Movably mounted upon the body 1 within easy reach of the operator is an actuating member which may be a pedal 7. Pivotally connected with the pedal 7 is a rearwardly extended connecting rod 8, pivotally united with a crank arm 9, secured to an upright shaft 10, journaled in a bearing 11 which may be mounted upon the differential casing 3, or may be supported in any other desired manner. There is an abutment 12 upon the shaft 10 which prevents a vertical movement of the shaft without interfering with the rotation of the shaft. Secured to the shaft 10 is an arm 14, spaced from the lower end of the shaft 10, and secured to the shaft 10 adjacent its lower end is an arm 15. A link 16 is pivotally connected with the arm 14, the outer end of the link 16 being pivotally connected with a rod 17, mounted to slide in a bearing 18, the bearing 18 constituting, preferably, a portion of the rear axle 2. The rod 17 is provided with a depending arm 19. A link 20 is pivotally connected with the arm 15, the link 20 being pivotally connected with a rod 21 mounted to slide in a bearing 22 upheld by the differential casing 3 or in any other manner. The outer end of the rod 21 is mounted to slide in a bearing 23 which may constitute a portion of the rear axle 2. The rod 21 terminates in a depending arm 24. The arms 19 and 24 support shoes 25, and since the shoes 25 are of identical construction, but one shoe will be described.

Referring specifically to Fig. 3, it will be observed that each shoe 25 comprises an arcuate segment 26, the center of curvature of which, preferably, is co-incident with the center of the axle 2. The other segment 27 of the shoe 25 is arcuate and its center of curvature is located eccentrically with respect with the center of the rear axle 2. The segment 27 of the shoe 25 is equipped at its end with an outwardly projecting lip 28. The shoe 25 is adapted to co-act with rollers 29 carried by shafts 30, the shafts 30 constituting the pivotal connection between links 31 and 32, the adjacent ends of which are shouldered to form a rule joint 33. Springs 34 connect the links 31 and 32 and serve to maintain the same at an angle to each other. The links 32 are pivotally connected with the hub 4 as indicated at 35, and the links 31 are pivotally connected as indicated at 36 with grips 37 which may comprise a plurality of tines 38, the tines of the grips being slidably mounted in an annular extension 39 of the rim 5 of the wheel.

In practical operation, by actuating the pedal 7, the connecting rod 8 will be moved, the connecting rod 8 through the medium of the arm 9 rotating the shaft 10. The shaft 10 will actuate the arms 14 and 15, the arm 15 actuating the link 20 and sliding the rod 21 longitudinally, whereupon the arm 24 of the rod 21 will advance one shoe 25 within the circumference defined by the rollers 29. The rollers 29 will be engaged by the segment 27 of the shoe and will ride thence upon the segment 26, the shafts 30 being moved radially of the wheel, and the links 31 and 32 being straightened out, the links 31 and 32 serving to advance the grips 37 so that the tines 38 thereof project beyond the periphery of the tire 6 and engage the ground. The tines 38 will be held in projected position, until the rollers, respectively, have ridden off the free end of the segment 26. The lip 28 serves to engage the rollers 29 in the first instance, and to move the rollers outwardly so as to permit the rollers to come into engagement with the segment 26, it being obvious that in the absence of the lip 28 or its equivalent, the shoe 25, when thrust outwardly, would merely bear against the end faces of the rollers 29 and would not enter within the circumferences described by the rollers. Each roller 29 constitutes a projection which is mounted to move in an orbit. When the shoe 25 is moved horizontally, the shoe moves into intersecting relation to the orbit described by the projection or roller 29. The lip 28, as will be understood readily is adapted to receive the projection or roller 29 initially. So soon as any one roller 29 has ridden off the free end of the segment 26 the spring 34 will move the links 31 and 32 into angular relation with respect to each other, and thus retract the corresponding grip 37.

Having thus described the invention, what is claimed is:—

1. In a device of the class described, a wheel comprising a rim and a hub; a grip slidable in the rim; a link pivoted to the grip; a link pivoted to the hub; a pivot element uniting the inner ends of the links and independent of the hub; shoe-engaging means carried by the pivot element; a shoe under the control of an operator; and means for moving the shoe into and out of the orbit described by the shoe engaging means on the pivot element as the wheel rotates, thereby to actuate the links and to advance the grip with respect to the rim.

2. In a device of the class described, a wheel including a rim and a hub; a grip slidable in the rim; a link pivoted to said grip; a link pivoted to the hub; a pivot element uniting the links and extending transversely of the wheel; an anti-friction member mounted upon the pivot element; a shoe movable into and out of the circumference described by the anti-friction element as the wheel rotates; a spring secured to one link and bearing on the other link; and means under the control of an operator for manipulating the shoe.

3. In a device of the class described, a wheel comprising a rim and a hub; a grip slidable in the rim; a link pivoted to the grip; a link pivoted to the hub; a pivot-element uniting the links; a spring secured to one link and bearing upon the other link; the links and the pivot element forming an expansible structure, a portion of which projects laterally; a shoe movable into and out of the circumference described by the laterally projecting portion of the expansible structure; and means for operating the shoe.

4. In a device of the class described, a wheel including a rim and a hub; grips mounted to move on the wheel; yieldable connections between the respective grips and the wheel, each yieldable connection being provided with a projection the end of which is movable in an orbit the plane of which is substantially parallel to the side face of the wheel; a shoe mounted to move transversely of the wheel and into intersecting relation to the orbit described by the ends of the projections, one end of the shoe having a lateral lip disposed transversely of the plane defined by said orbit and adapted to engage one projection, thereby pushing the same outwardly and permitting the next projection to ride on the outer face of the shoe.

In testimony that I claim the foregoing as my own, I have hereto affixed my signature in the presence of two witnesses.

FRANK H. BABCOCK.

Witnesses:
ELIZABETH RAPP,
J. W. BAUGHMAN.